(12) United States Patent
Sakakibara (10) Patent No.: US 11,040,629 B2
(45) Date of Patent: Jun. 22, 2021

(54) FUEL CELL VEHICLE

(71) Applicant: TOYOTA JIDOSHA KABUSHIKI KAISHA, Toyota (JP)

(72) Inventor: Hideaki Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 16/408,541

(22) Filed: May 10, 2019

(65) Prior Publication Data

US 2019/0381901 A1 Dec. 19, 2019

(30) Foreign Application Priority Data

Jun. 14, 2018 (JP) .............................. JP2018-113347

(51) Int. Cl.
| | | |
|---|---|---|
| *B60L 50/72* | (2019.01) | |
| *H01M 8/04029* | (2016.01) | |
| *H01M 8/04701* | (2016.01) | |
| *B60K 1/04* | (2019.01) | |
| *H01M 8/04791* | (2016.01) | |

(52) U.S. Cl.
CPC ............... *B60L 50/72* (2019.02); *B60K 1/04* (2013.01); *H01M 8/04029* (2013.01); *H01M 8/04701* (2013.01); *H01M 8/04813* (2013.01); *B60K 2001/0411* (2013.01); *B60Y 2306/01* (2013.01); *H01M 2250/20* (2013.01)

(58) Field of Classification Search
CPC .......... H01M 8/04029; H01M 8/04813; B60L 50/72; B60K 2001/0411

USPC ......................................................... 429/437
See application file for complete search history.

(56) References Cited

U.S. PATENT DOCUMENTS

| | | | |
|---|---|---|---|
| 2003/0108784 A1 | 6/2003 | Enjoji et al. | |
| 2017/0096172 A1 | 4/2017 | Nagaosa | |
| 2017/0297513 A1 | 10/2017 | Katano | |
| 2018/0145349 A1* | 5/2018 | Yamaguchi | .......... B01D 15/362 |

FOREIGN PATENT DOCUMENTS

| | | |
|---|---|---|
| JP | 2003-173790 A | 6/2003 |
| JP | 2015-231319 A | 12/2015 |
| JP | 2017-190090 A | 10/2017 |

* cited by examiner

*Primary Examiner* — James M Erwin
(74) *Attorney, Agent, or Firm* — Sughrue Mion, PLLC (57) ABSTRACT

A fuel cell vehicle according to the present disclosure includes, in a front room: a fuel cell stack fixed to an upper part of a stack frame; a high voltage element fixed to an upper part of the fuel cell stack; and an ion exchanger that is arranged in front of the fuel cell stack and the high voltage element. The stack frame is provided with an inclined part, and when the ion exchanger is displaced rearward at the time of a frontal crash of the fuel cell vehicle, a rear part in a lower end of the ion exchanger is slid along an inclined surface of the inclined part and the ion exchanger is displaced in a diagonally upward direction, whereby the cap part of the ion exchanger is positioned on the upper side in the vertical direction with respect to the high voltage element.

5 Claims, 6 Drawing Sheets

FUEL CELL VEHICLE

CROSS REFERENCE TO RELATED APPLICATIONS

This application is based upon and claims the benefit of priority from Japanese patent application No. 2018-113347, filed on Jun. 14, 2018, the disclosure of which is incorporated herein in its entirety by reference.

BACKGROUND

The present disclosure relates to a fuel cell vehicle.

In recent years, fuel cell vehicles that use fuel cells as a power source have been developed. The fuel cell is a device that generates electric power using an electrochemical reaction between fuel gas and oxidant gas, and includes a fuel cell stack in which a plurality of fuel battery single cells are stacked.

Japanese Unexamined Patent Application Publication No. 2017-190090 discloses a technique that relates to a fuel cell vehicle having a front room that accommodates a fuel cell stack and high voltage elements (FCPC and PCU).

SUMMARY

In the technique disclosed in Japanese Unexamined Patent Application Publication No. 2017-190090, the fuel cell stack and the high voltage elements (FCPC and PCU) are accommodated in the front room of the fuel cell vehicle. Since the fuel cell stack generates heat at the time of power generation, the fuel cell stack needs to be cooled by a cooling liquid. When the fuel cell stack is cooled by the cooling liquid, ions are generated in the cooling liquid, and the ions included in the cooling liquid need to be removed using an ion exchanger. Since the ion exchanger is a component that requires regular maintenance, the ion exchanger needs to be arranged in a position where it is easily accessible to maintenance, more specifically, in front of the fuel cell stack and the high voltage element.

However, since the ion exchanger includes a highly rigid part (cap part), there is a problem that the ion exchanger is displaced rearward at the time of a frontal crash of the fuel cell vehicle and the highly rigid cap part hits the high voltage element, which causes damage in the high voltage element due to this impact.

In view of the aforementioned problem, an object of the present disclosure is to provide a fuel cell vehicle capable of preventing the high voltage element from being damaged at the time of the frontal crash.

A fuel cell vehicle according to one aspect of the present disclosure includes, in a front room: a fuel cell stack fixed to an upper part of a stack frame; a high voltage element fixed to an upper part of the fuel cell stack; and an ion exchanger that is arranged in front of the fuel cell stack and the high voltage element and removes ions included in a cooling liquid, the cooling liquid cooling the fuel cell stack. The ion exchanger includes a main body part and a cap part that is provided on an upper side of the main body part and is more rigid than the main body part is, and the stack frame is protruded further forward than the fuel cell stack is and includes an inclined part on an upper side of the protruded part. An inclined surface of the inclined part is inclined rearward with respect to an upper side in a vertical direction, and when the ion exchanger is displaced rearward at the time of a frontal crash of the fuel cell vehicle, a rear part in a lower end of the ion exchanger is slid along the inclined surface of the inclined part and the ion exchanger is displaced in a diagonally upward direction, whereby the cap part of the ion exchanger is positioned on the upper side in the vertical direction with respect to the high voltage element.

In the aforementioned fuel cell vehicle, the inclined part is provided on the upper side of the protruded part of the stack frame. By providing the inclined part in this way, when the ion exchanger is displaced rearward at the time of the frontal crash of the fuel cell vehicle, the ion exchanger can be displaced in the diagonally upward direction. Accordingly, the cap part of the ion exchanger in the vertical direction can be provided on the upper side of the high voltage element in the vertical direction, whereby it is possible to prevent the high voltage element from being damaged at the time of the frontal crash.

In the aforementioned fuel cell vehicle, an inclined surface that is parallel to the inclined surface of the inclined part may be formed in the rear part of the lower end of the ion exchanger.

By forming the inclined surface in the rear part of the lower end of the ion exchanger in this way, the ion exchanger can be smoothly displaced in the diagonally upward direction.

In the aforementioned fuel cell vehicle, the main body part of the ion exchanger may be fixed to the front of the fuel cell stack at a withstand load stronger than the load at which the main body part of the ion exchanger is damaged at the time of the frontal crash of the fuel cell vehicle.

According to the aforementioned configuration, at the time of the frontal crash of the fuel cell vehicle, the ion exchanger can be crushed and play a role as a cushion without the ion exchanger being separated from the fuel cell stack. It is therefore possible to reduce the impact acting on the fuel cell stack and the high voltage element at the time of the frontal crash.

In the aforementioned fuel cell vehicle, the main body part of the ion exchanger may be formed in such a way that the thickness of a side wall of the main body part in a right-left direction becomes smaller than the thickness of a side wall of the main body part in a front-back direction.

By forming the ion exchanger in this way, the ion exchanger tends to be crushed when stress is applied to the front part of the ion exchanger, whereby it is possible to improve the cushion effect of the ion exchanger at the time of the frontal crash.

In the aforementioned fuel cell vehicle, the main body part of the ion exchanger may include a separator that divides the cooling liquid inside the main body part, a radiator may be arranged in front of the ion exchanger, and the radiator and the ion exchanger may be arranged in such a way that the position of at least one of a side plate, a fan shroud, and a radiator support upper included in the radiator in a vertical direction does not overlap the position of at least one of the separator and the cap part of the ion exchanger in the vertical direction.

By arranging the ion exchanger and the radiator as described above, it is possible to prevent a strong force from being applied from the radiator to the ion exchanger at the time of the frontal crash of the fuel cell vehicle. Accordingly, it is possible to prevent a strong force from being applied from the ion exchanger to the fuel cell stack and the high voltage element and to thus prevent the fuel cell stack and the high voltage element from being damaged.

According to the present disclosure, it is possible to provide a fuel cell vehicle capable of preventing the high voltage element from being damaged at the time of the frontal crash.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, an embodiment of the present disclosure will be explained.

Figure 1:
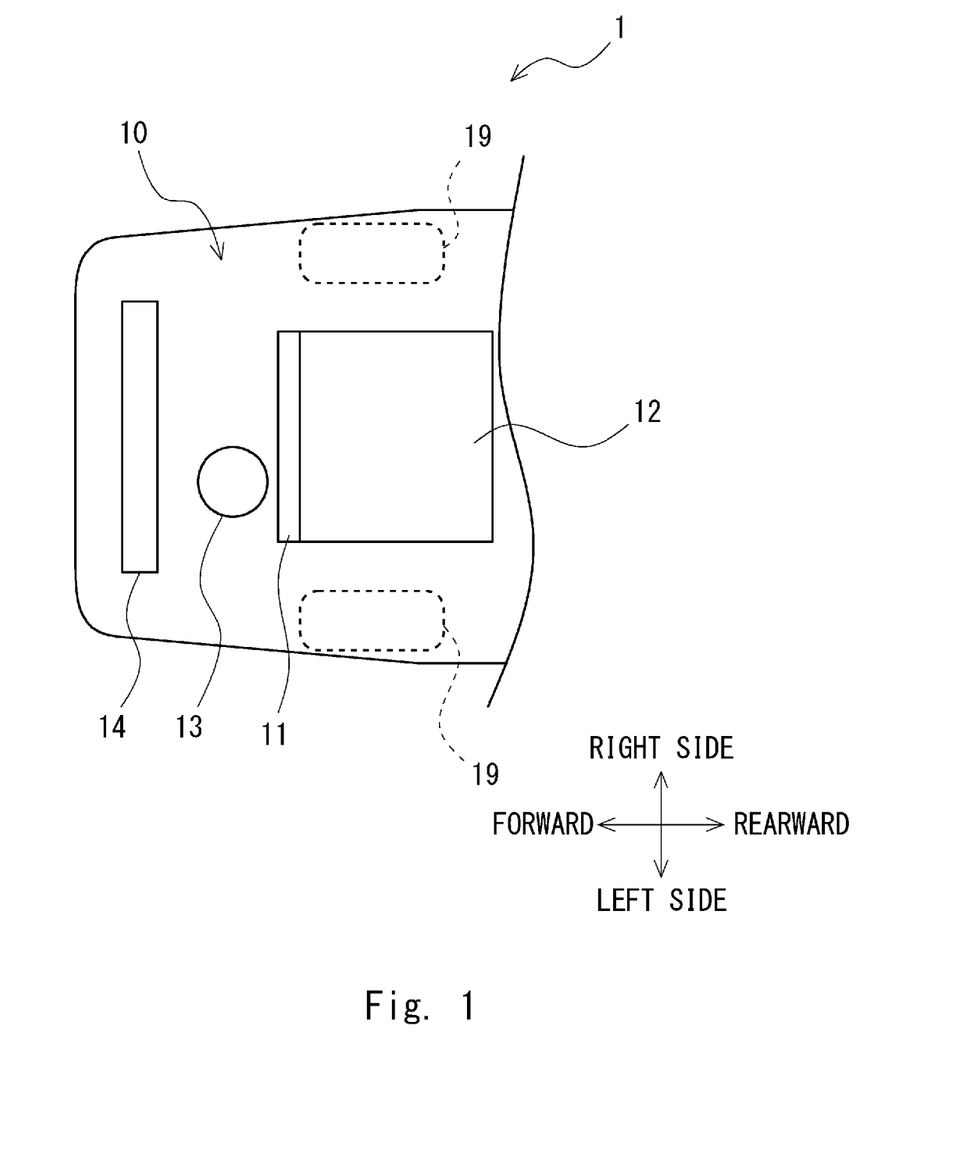
FIG. 1 is a top view for describing a part around a front room of a fuel cell vehicle according to one embodiment.

FIG. 1 is a top view for describing a part around a front room of a fuel cell vehicle according to this embodiment. As shown in FIG. 1, a fuel cell stack 11, a high voltage element 12, an ion exchanger 13, and a radiator 14 are accommodated in a front room 10 of a fuel cell vehicle 1. Front wheels 19 are arranged in the right and left sides in the vicinity of the front room 10 of the fuel cell vehicle 1. In FIG. 1, only the components that are necessary for the explanation of the present disclosure are shown and the components other than these components are not shown.

Figure 2:
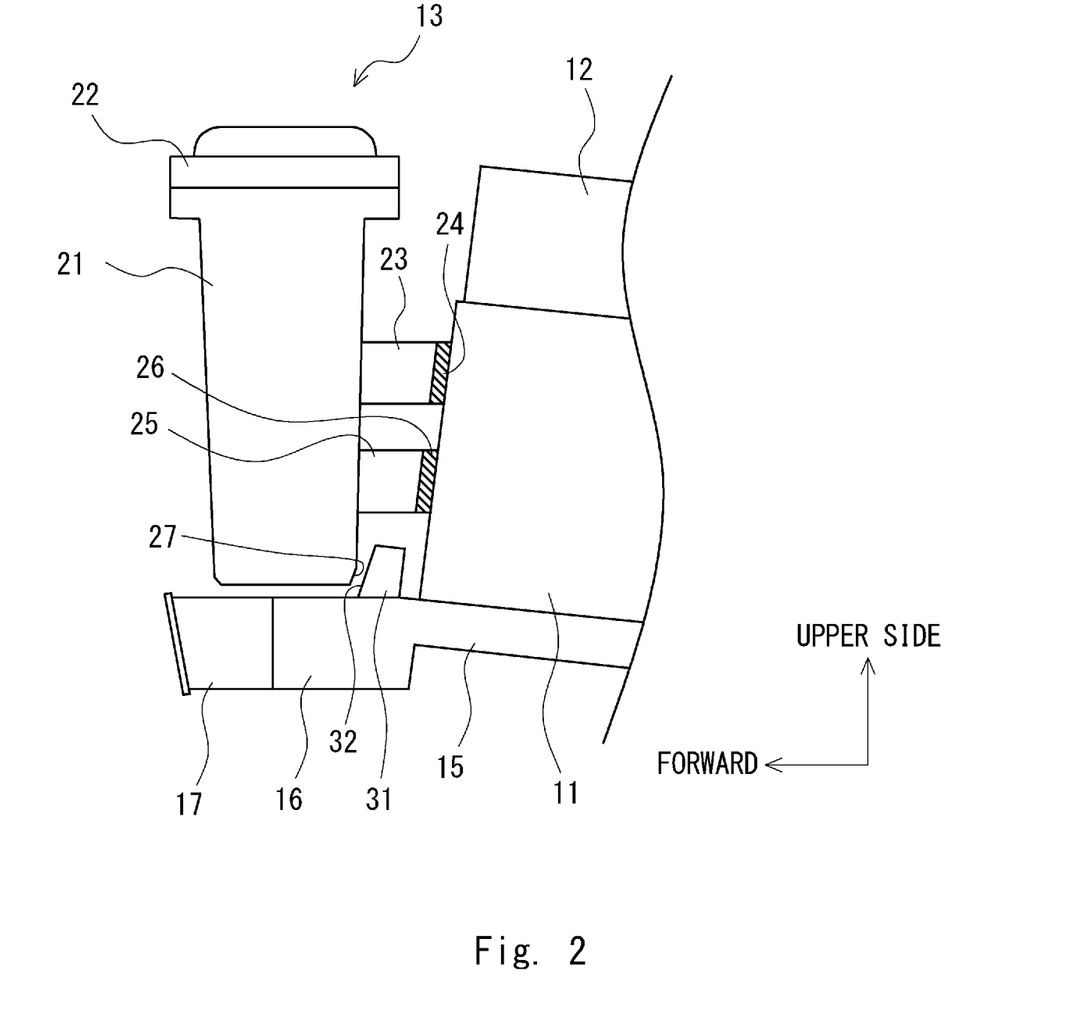
FIG. 2 is a side view for describing an arrangement of a fuel cell stack, a high voltage element, and an ion exchanger in the fuel cell vehicle according to this embodiment.

FIG. 2 is a side view for describing an arrangement of the fuel cell stack, the high voltage element, and the ion exchanger of the fuel cell vehicle according to this embodiment. As shown in FIG. 2, the fuel cell stack 11 is fixed to an upper part of a stack frame 15. The fuel cell stack 11 generates power by means of an electrochemical reaction between fuel gas and oxidant gas. The fuel cell stack 11 is supplied with fuel gas and oxidant gas. Further, since heat is generated in the fuel cell stack 11 at the time of power generation, the fuel cell stack 11 is cooled using a cooling liquid.

The high voltage element 12 is fixed to an upper part of the fuel cell stack 11. The high voltage element 12 is, for example, an FC converter, an inverter for a motor, a pump inverter, or a battery converter. The FC converter is, for example, a DC-DC converter that boosts an output voltage of the fuel cell stack 11 to a high voltage that is suitable for driving a drive motor. Further, the inverter for the motor is a circuit configured to convert DC power boosted by the FC converter into a three-phase alternating current and supply this three-phase alternating current to the drive motor. For example, the FC converter and the pump inverter may be referred to as a Fuel Cell Power Conditioner (FCPC). Further, the inverter for the motor and the battery converter may be referred to as a Power Control Unit (PCU).

In this embodiment, the high voltage element 12 is not limited to these elements and may be elements other than them as long as these elements are parts that handle a high voltage.

The ion exchanger 13 removes ions included in the cooling liquid that cools the fuel cell stack 11. The ion exchanger 13 is arranged in front of the fuel cell stack 11 and the high voltage element 12. Since the ion exchanger 13 is a part that requires regular maintenance, it is arranged in front of the fuel cell stack 11 and the high voltage element 12 as described above where it is easily accessible to maintenance.

The ion exchanger 13 includes a main body part 21 and a cap part 22. An ion exchange resin for absorbing the ions included in the cooling liquid is accommodated in the main body part 21. The cap part 22, which is a member for covering the main body part 21, is provided on the upper side of the main body part 21. The cap part 22 has a property that it is more rigid than the main body part 21 is (i.e., hard and is not likely to be deformed). That is, while the main body part 21 and the cap part 22 are each formed of a material such as a metallic material that has a high rigidity, the rigidity of the main body part 21 in the horizontal direction is low since it includes a space that accommodates the ion exchange resin therein. On the other hand, since the cap part 22 is a member for covering the main body part 21 and does not include a space therein, the cap part 22 is more rigid than the main body part 21 is.

The ion exchanger 13 is fixed to the front of the fuel cell stack 11. Specifically, attachment parts 23 and 25 extending rearward are provided in the main body part 21 of the ion exchanger 13. By fixing these attachment parts 23 and 25 to fastening parts 24 and 26 of the fuel cell stack 11, the ion exchanger 13 can be fixed to the fuel cell stack 11. The main body part 21 of the ion exchanger 13 is fixed, for example, to the fastening parts 24 and 26 located in front of the fuel cell stack 11 at a withstand load stronger than the load at which the main body part 21 of the ion exchanger 13 is damaged at the time of a frontal crash of the fuel cell vehicle 1.

The stack frame 15 to which the fuel cell stack 11 is fixed includes a protruding part 16 that protrudes further forward than the fuel cell stack 11 does. A crash box 17 is provided further forward than the protruding part 16 is. The crash box 17 is a member that is deformed at the time of a collision, and thus absorbs the energy at the time of the collision in order to reduce an impact acting on the vehicle.

Further, an inclined part 31 is provided on an upper side of the protruding part 16 of the stack frame 15. An inclined surface 32 is provided in the inclined part 31. The inclined surface 32 of the inclined part 31 is inclined rearward with respect to the upper side of the vertical direction.

Figure 3:
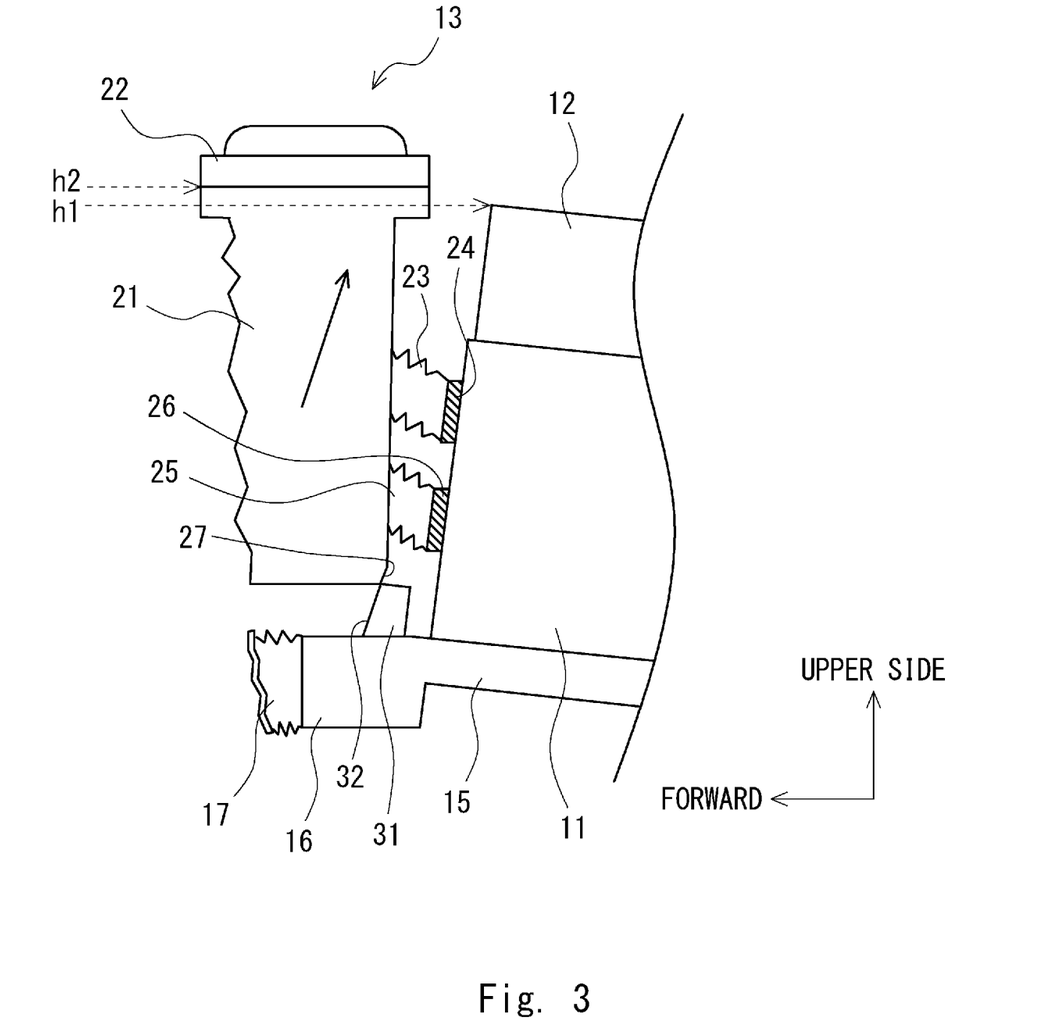
FIG. 3 is a side view for describing an arrangement of the fuel cell stack, the high voltage element, and the ion exchanger at the time of a frontal crash of the fuel cell vehicle according to this embodiment.

As shown in FIG. 3, by providing the inclined part 31, when the ion exchanger 13 is displaced rearward at the time of the frontal crash of the fuel cell vehicle 1, a rear part 27 in a lower end of the ion exchanger 13 can be slid along the inclined surface 32 of the inclined part 31 and the ion exchanger 13 can be displaced in the diagonally upward direction. Accordingly, a position h2 of the cap part 22 of the ion exchanger 13 in the vertical direction (i.e., height h2 of the lower end of the cap part 22 in the vertical direction) can be positioned above a position h1 of the high voltage element 12 in the vertical direction (i.e., height h1 of the upper end of the high voltage element 12 in the vertical direction). It is therefore possible to prevent the high voltage element 12 from being damaged at the time of the frontal crash.

That is, in the fuel cell vehicle 1 according to this embodiment, the ion exchanger 13 is arranged in front of the fuel cell stack 11 and the high voltage element 12 in view of easiness of maintenance thereof. However, since the ion exchanger 13 includes a highly rigid part like the cap part 22, there is a problem that the ion exchanger 13 is displaced rearward at the time of the frontal crash of the fuel cell vehicle 1, the highly rigid cap part 22 hits the high voltage element 12, and the high voltage element 12 is damaged due to this impact.

In order to solve the aforementioned problem, in the fuel cell vehicle 1 according to this embodiment, the inclined part 31 is provided above the protruded part of the stack frame 15 (protruding part 16). By providing the inclined part 31 in this way, when the ion exchanger 13 is displaced rearward at the time of the frontal crash of the fuel cell vehicle 1, the ion exchanger 13 can be displaced in the diagonally upward direction. Accordingly, the position of the cap part 22 of the ion exchanger 13 in the vertical direction may be made upper than the position of the high voltage element 12 in the vertical direction, whereby it is possible to prevent the high voltage element 12 from being damaged at the time of the frontal crash.

As shown in FIG. 2, an inclined surface that is parallel to the inclined surface 32 of the inclined part 31 may be formed in the rear part 27 of the lower end of the ion exchanger 13. That the inclined surface is parallel to the inclined surface 32 includes, besides a case in which it is parallel to the inclined surface 32, a case in which it is substantially parallel to the inclined surface 32. In this way, by forming the inclined surface in the rear part 27 of the lower end of the ion exchanger 13, the ion exchanger 13 can be smoothly displaced in the diagonally upward direction.

Further, in this embodiment, the ion exchanger 13 is fixed to the fuel cell stack 11 at a withstand load stronger than the load at which the main body part 21 of the ion exchanger 13 is damaged at the time of the frontal crash of the fuel cell vehicle 1. Accordingly, as shown in FIG. 3, at the time of the frontal crash of the fuel cell vehicle 1, the ion exchanger 13 can be crushed and play a role as a cushion without the ion exchanger 13 being separated from the fuel cell stack 11. It is therefore possible to reduce the impact acting on the fuel cell stack 11 and the high voltage element 12 at the time of the frontal crash. In this case, as shown in FIG. 3, the crash box 17 is also deformed at the time of the frontal crash, whereby it is possible to absorb the energy at the time of the frontal crash and to reduce the impact acting on the vehicle.

Assume a case, for example, in which the load at which the main body part 21 of the ion exchanger 13 is damaged is set to be equal to or smaller than 10 kN and the ion exchanger 13 is fixed to the fuel cell stack 11 at a withstand load of 100 kN. In this case, when a load lower than 100 kN is applied to the ion exchanger 13, the ion exchanger 13 can be crushed and play a role as a cushion without the ion exchanger 13 being separated from the fuel cell stack 11.

Figure 4:
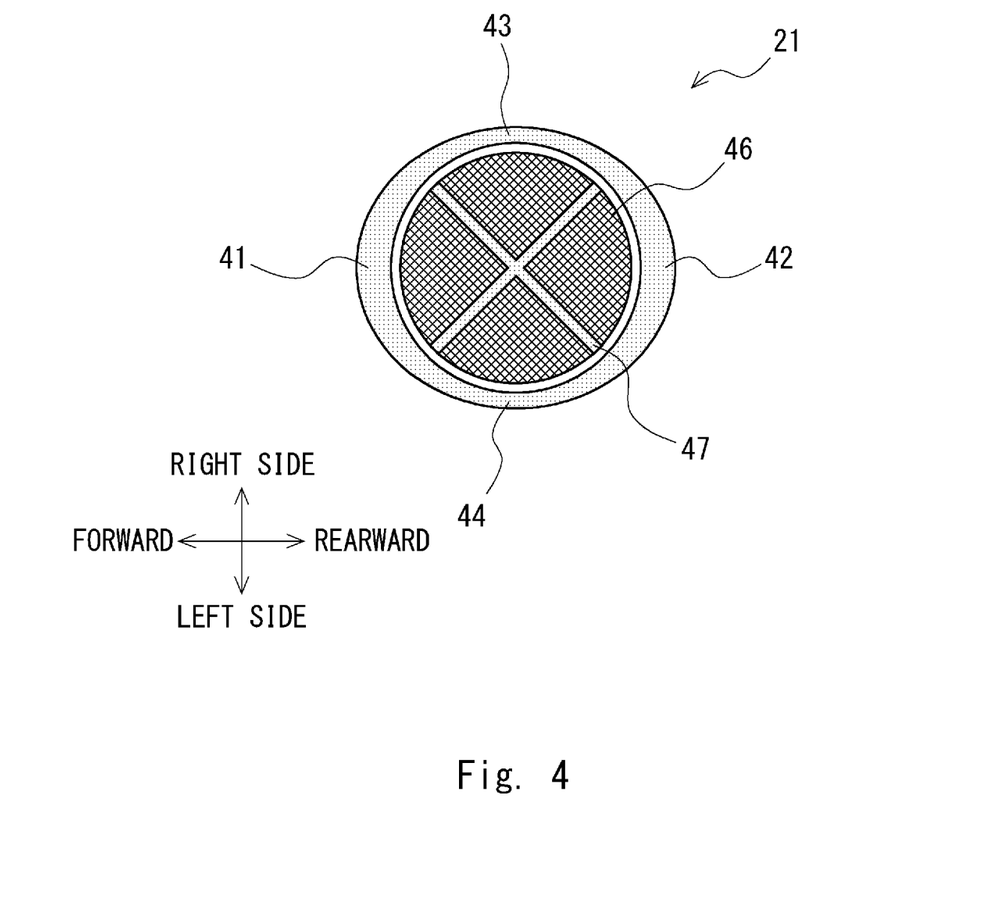
FIG. 4 is a cross-sectional view of the ion exchanger in the horizontal direction.

FIG. 4 is a cross-sectional view of the ion exchanger in the horizontal direction. As shown in FIG. 4, an ion exchange resin 46 for absorbing the ions included in the cooling liquid is accommodated inside the main body part 21 of the ion exchanger 13. The inside of the main body part 21 is partitioned using a plate-like mesh stay 47, and the ion exchange resin 46 is arranged in each space partitioned by the mesh stay 47. In this case, by arranging the ion exchange resin 46 in such a way that the mesh stay 47 is not parallel with the front-back direction, the ion exchanger 13 is easily crushed when stress is applied to the front part of the ion exchanger 13, whereby it is possible to improve the cushion effect of the ion exchanger 13 at the time of the frontal crash. In the example shown in FIG. 4, an example in which the mesh stay 47 is deviated by 45 degrees with respect to the front-back direction is illustrated.

Further, as shown in FIG. 4, when the main body part 21 of the ion exchanger 13 is formed, the thickness of side walls 43 and 44 of the main body part 21 of the ion exchanger 13 in the right-left direction may be made smaller than that of side walls 41 and 42 of the main body part 21 in the front-back direction. By forming the ion exchanger 13 in this way, the ion exchanger 13 can be easily crushed when stress is applied to the front part of the ion exchanger 13, whereby it is possible to improve the cushion effect of the ion exchanger 13 at the time of the frontal crash.

Figure 5:
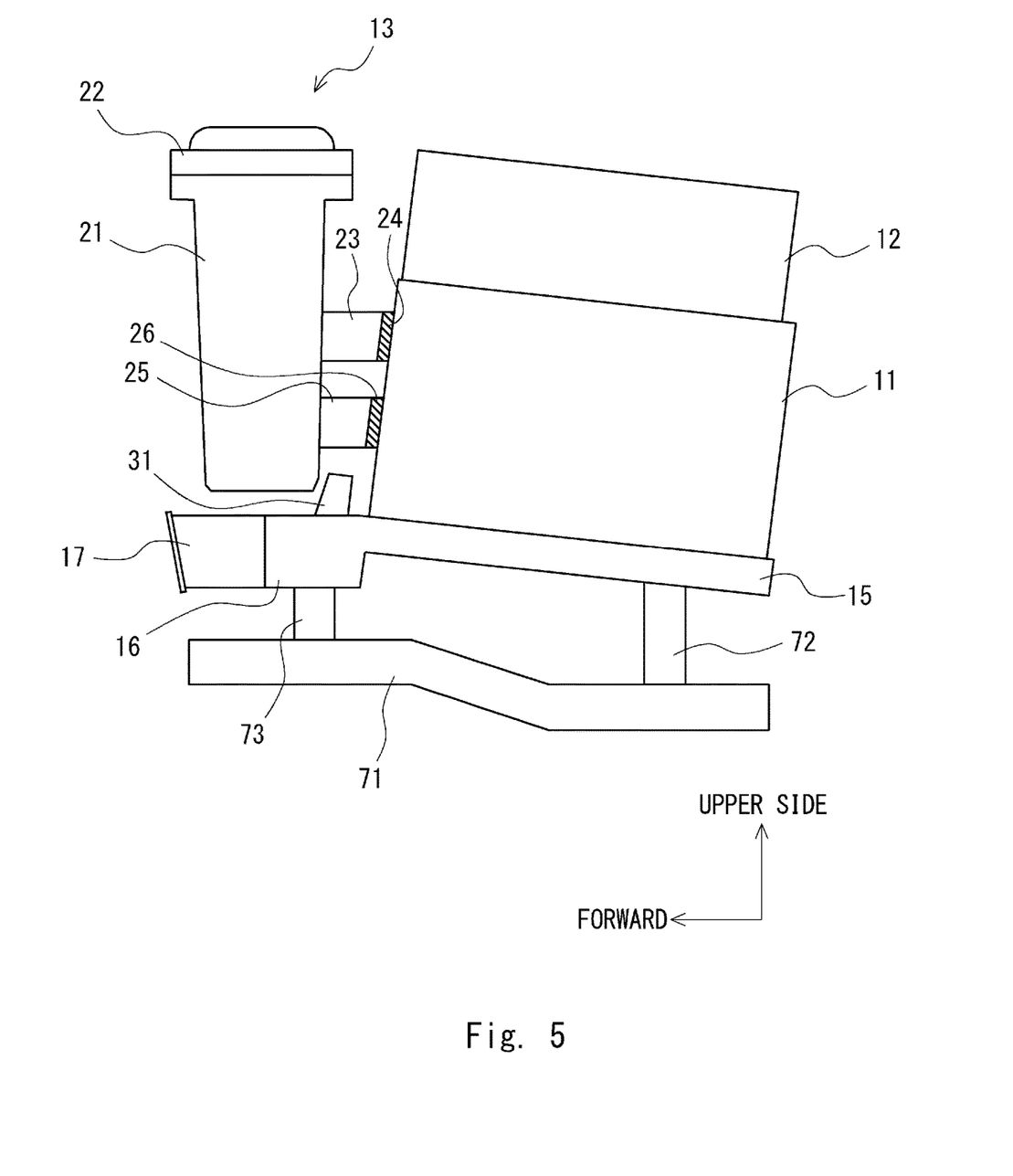
FIG. 5 is a side view showing a state in which the fuel cell stack and the like of the fuel cell vehicle according to this embodiment is attached to a suspension member.

FIG. 5 is a side view showing a state in which the fuel cell stack and the like of the fuel cell vehicle according to this embodiment is attached to a suspension member. As shown in FIG. 5, the stack frame 15 on which the fuel cell stack 11, the high voltage element 12, and the ion exchanger 13 are mounted is fixed to a suspension member 71 using supporting members 72 and 73. While FIG. 5 shows the left side view of the fuel cell vehicle, the stack frame 15 is fixed to the suspension member using supporting members also on the right side of the fuel cell vehicle. That is, the stack frame 15 is fixed to the suspension member 71 in a total of four parts.

The stack frame 15 is fixed, for example, to the suspension member 71 at a withstand load of 100 kN. When, for example, a load larger than 100 kN is applied at the time of the frontal crash, due to the deformation of the suspension member 71 and a retraction force of the stack frame 15, the supporting members 72 and 73 are broken and the stack frame 15 is separated from the suspension member 71. In this case, the whole stack frame 15 on which the fuel cell stack 11, the high voltage element 12, and the ion exchanger 13 are mounted is retracted, whereby it is possible to prevent a strong impact from acting on the fuel cell stack 11 and the high voltage element 12.

In the aforementioned example, the stack frame 15 is attached to the suspension member 71 at a withstand load of 100 kN, the load at which the main body part 21 of the ion exchanger 13 is damaged is set to be equal to or smaller than 10 kN, and the ion exchanger 13 is fixed to the fuel cell stack 11 at a withstand load of 100 kN. Therefore, when a load that is applied at the time of the frontal crash is smaller than 100 kN, it is possible to absorb the impact using the ion exchanger 13 as a cushion. Further, when the load applied at the time of the frontal crash is larger than 100 kN, the impact is absorbed using the ion exchanger 13 as a cushion, and the stack frame 15 is separated from the suspension member 71, and the whole stack frame 15 on which the fuel cell stack 11 and the like are mounted is retracted, whereby it is possible to prevent a strong impact from acting on the fuel cell stack 11 and the high voltage element 12.

Figure 6:
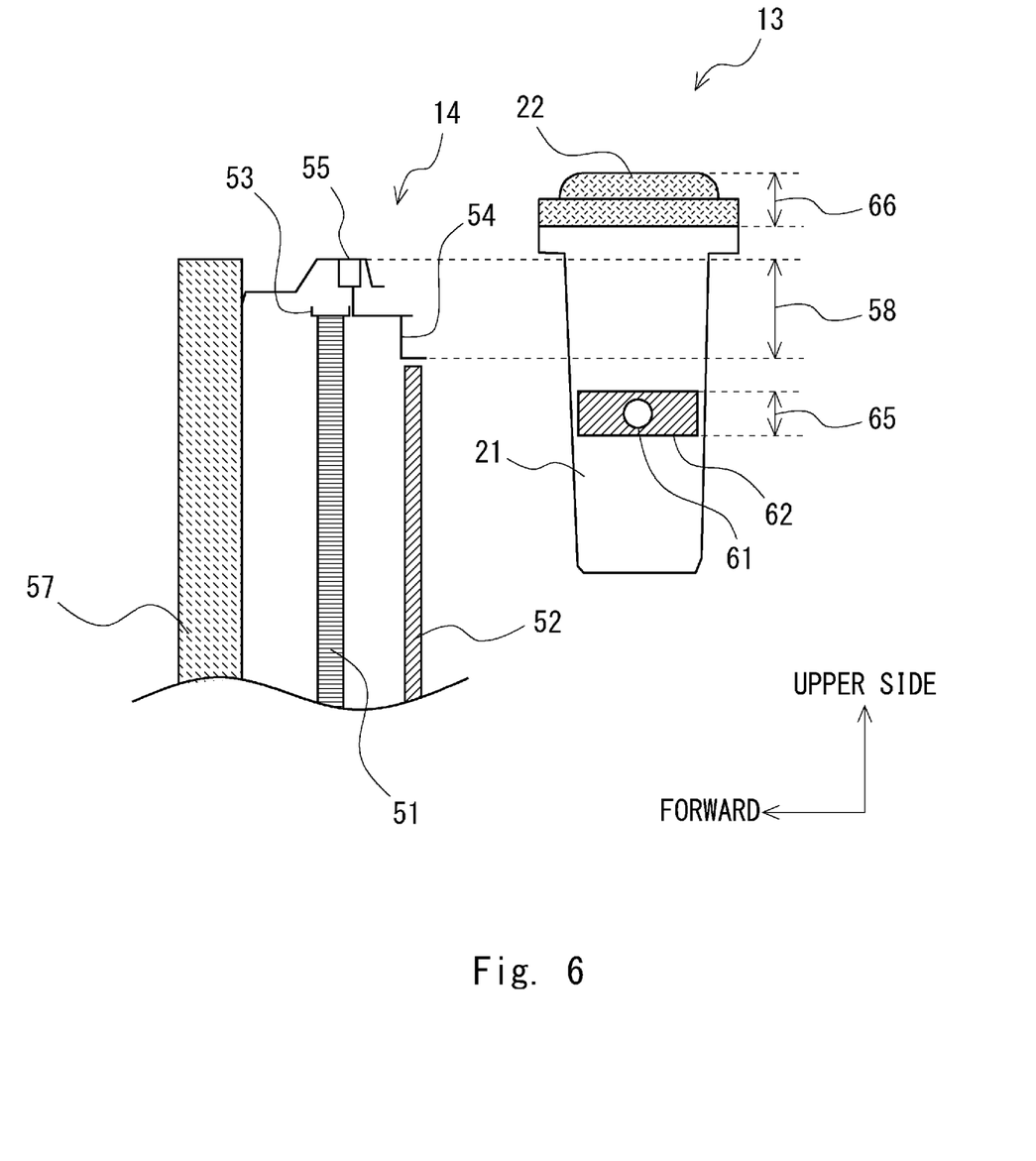
FIG. 6 is a cross-sectional view for describing a positional relation of the ion exchanger and a radiator in the vertical direction.

FIG. 6 is a cross-sectional view for describing a positional relation between the ion exchanger and the radiator in the vertical direction. As shown in FIG. 6, the radiator 14 is arranged in front of the ion exchanger 13 (see FIG. 1). The radiator 14 includes a radiator body 51 and a fan 52. The radiator body 51 radiates heat of the cooling liquid used to cool the fuel cell stack 11. The fan 52 sends wind to the radiator body 51, thereby promoting the heat radiation in the radiator body 51.

A side plate 53 is arranged in the upper part of the radiator body 51. Further, a fan shroud 54 is arranged around the fan 52. Further, a radiator support upper 55 is arranged in the upper part of the radiator body 51 and the fan 52. A barrier 57 that absorbs an impact is attached to the radiator support upper 55. Of the members that compose the radiator 14, the side plate 53, the fan shroud 54, and the radiator support upper 55 are highly rigid members.

Further, a separator 62 that separates the cooling liquid inside the main body part 21 is provided in the main body part 21 of the ion exchanger 13. That is, while the cooling liquid is supplied to the main body part 21 from a supply port 61, the separator 62 that separates this cooling liquid inside the main body part 21 is provided.

Since the separator 62 is a highly rigid member, when the position of the highly rigid member of the members that compose the radiator 14 arranged in front of the ion exchanger 13 in the vertical direction overlaps the position of the separator 62 of the ion exchanger 13 in the vertical direction, at the time of the frontal crash of the fuel cell vehicle 1, a strong force is applied to the ion exchanger 13 from the radiator 14. When a strong force is applied to the ion exchanger 13 in this way, the strong force is transmitted from the ion exchanger 13 to the fuel cell stack 11 and the high voltage element 12, which may cause the fuel cell stack 11 and the high voltage element 12 to be damaged.

That is, a strong force is applied to the ion exchanger 13 from the radiator 14 at the time of the frontal crash of the fuel cell vehicle 1. When highly rigid members of the members that compose the ion exchanger 13 and the radiator 14 are aligned in the horizontal direction, a particularly strong force is transmitted to the fuel cell stack 11 and the high voltage element 12 in this part, which may cause the fuel cell stack 11 and the high voltage element 12 to be damaged.

In view of the aforementioned problem, in this embodiment, when the ion exchanger 13 and the radiator 14 are arranged, they are arranged in such a way that the position of the side plate 53, the fan shroud 54, and the radiator support upper 55 included in the radiator 14 in the vertical direction does not overlap the position of the separator 62 and the cap part 22 of the ion exchanger 13 in the vertical direction.

To be more specific, as shown in FIG. 6, the ion exchanger 13 and the radiator 14 are arranged in such a way that a position 58 of the side plate 53, the fan shroud 54, and the radiator support upper 55 included in the radiator 14 in the vertical direction does not overlap a position 65 of the separator 62 of the ion exchanger 13 in the vertical direction. Further, as shown in FIG. 6, the ion exchanger 13 and the radiator 14 are arranged in such a way that the position 58 of the side plate 53, the fan shroud 54, and the radiator support upper 55 included in the radiator 14 in the vertical direction does not overlap a position 66 of the cap part 22 of the ion exchanger 13 in the vertical direction.

By arranging the ion exchanger 13 and the radiator 14 as described above, it is possible to prevent a strong force from being applied to the ion exchanger 13 from the radiator 14 at the time of the frontal crash of the fuel cell vehicle 1. Accordingly, it is possible to prevent a strong force from being applied to the fuel cell stack 11 and the high voltage element 12 from the ion exchanger 13 and to thus prevent the fuel cell stack 11 and the high voltage element 12 from being damaged.

In the aforementioned example, the case in which the ion exchanger 13 and the radiator 14 are arranged in such a way that the position 58 of all the parts of the side plate 53, the fan shroud 54, and the radiator support upper 55 included in the radiator 14 in the vertical direction does not overlap the position of at least one of the separator 62 and the cap part 22 of the ion exchanger 13 in the vertical direction has been shown. However, in this embodiment, the ion exchanger 13 and the radiator 14 may be arranged in such a way that the position of at least one of the side plate 53, the fan shroud 54, and the radiator support upper 55 included in the radiator 14 in the vertical direction does not overlap the position of at least one of the separator 62 and the cap part 22 of the ion exchanger 13 in the vertical direction.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell vehicle comprising, in a front room:
    a fuel cell stack fixed to an upper part of a stack frame;
    a high voltage element fixed to an upper part of the fuel cell stack; and
    an ion exchanger that is arranged in front of the fuel cell stack and the high voltage element and removes ions included in a cooling liquid, the cooling liquid cooling the fuel cell stack, wherein
    the ion exchanger includes a main body part and a cap part that is provided on an upper side of the main body part and is more rigid than the main body part is,
    the stack frame is protruded further forward than the fuel cell stack is and includes an inclined part on an upper side of the protruded part, and
    an inclined surface of the inclined part is inclined rearward with respect to an upper side in a vertical direction, and when the ion exchanger is displaced rearward at the time of a frontal crash of the fuel cell vehicle, a rear part in a lower end of the ion exchanger is slid along the inclined surface of the inclined part and the ion exchanger is displaced in a diagonally upward direction, whereby the cap part of the ion exchanger is positioned on the upper side in the vertical direction with respect to the high voltage element.

2. The fuel cell vehicle according to claim 1, wherein an inclined surface that is parallel to the inclined surface of the inclined part is formed in the rear part of the lower end of the ion exchanger.

3. The fuel cell vehicle according to claim 1, wherein the main body part of the ion exchanger is fixed to the front of the fuel cell stack at a withstand load stronger than the load at which the main body part of the ion exchanger is damaged at the time of the frontal crash of the fuel cell vehicle.

4. The fuel cell vehicle according to claim 1, wherein the main body part of the ion exchanger is formed in such a way that the thickness of a side wall of the main body part in a right-left direction becomes smaller than the thickness of a side wall of the main body part in a front-back direction.

5. The fuel cell vehicle according to claim 1, wherein
    the main body part of the ion exchanger includes a separator that divides the cooling liquid inside the main body part,
    a radiator is arranged in front of the ion exchanger, and
    the radiator and the ion exchanger are arranged in such a way that the position of at least one of a side plate, a fan shroud, and a radiator support upper included in the radiator in a vertical direction does not overlap the position of at least one of the separator and the cap part of the ion exchanger in the vertical direction.

* * * * *